United States Patent

[11] 3,572,560

[72] Inventor Charles L. Dolph
 3395 N. Maple, Ann Arbor, Mich. 48103
[21] Appl. No. 833,651
[22] Filed June 16, 1969
[45] Patented Mar. 30, 1971

[54] PHOTOGRAPHY LUGGAGE
 9 Claims, 5 Drawing Figs.
[52] U.S. Cl. .................................................. 224/5V,
 150/28R, 220/97B
[51] Int. Cl. ................................................... A45c 11/38
[50] Field of Search ........................................ 220/97 (B);
 224/5, 5. (V), 26, 26.9; 150/33, 28, 52.8, 52;
 190/51

[56] References Cited
UNITED STATES PATENTS

| | | | |
|---|---|---|---|
| 1,260,737 | 3/1918 | White.......................... | (224/5-V) |
| 1,492,381 | 4/1924 | Lindenmayer.............. | (224/26) |
| 2,827,096 | 3/1958 | Hinson......................... | 150/52 |
| 2,888,970 | 6/1959 | Seaver......................... | 150/28 |

Primary Examiner—Gerald M. Forlenza
Assistant Examiner—Frank E. Werner
Attorney—Olsen and Stephenson ABSTRACT: Gadget luggage for storing and carrying small articles to be used with photographic equipment. Individual containers for the articles are connected together in a relatively flexible vertical column and are adapted to be supported by a shoulder strap in an arrangement such that any container can be opened to make its contents readily available without removing it from the vertical column.

Patented March 30, 1971
3,572,560
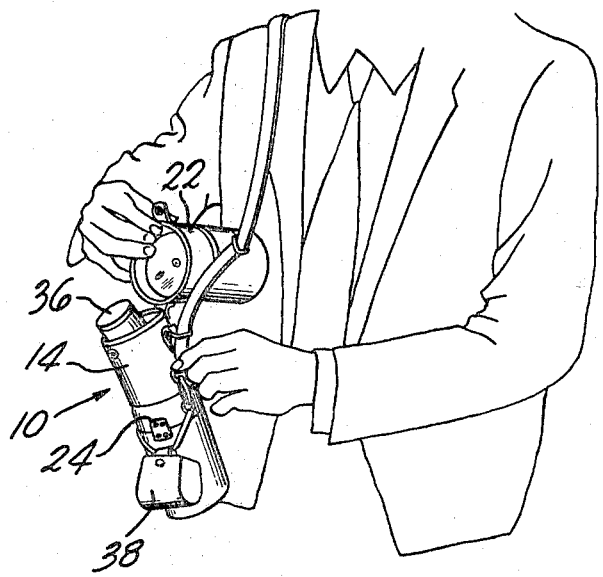
FIG. 1
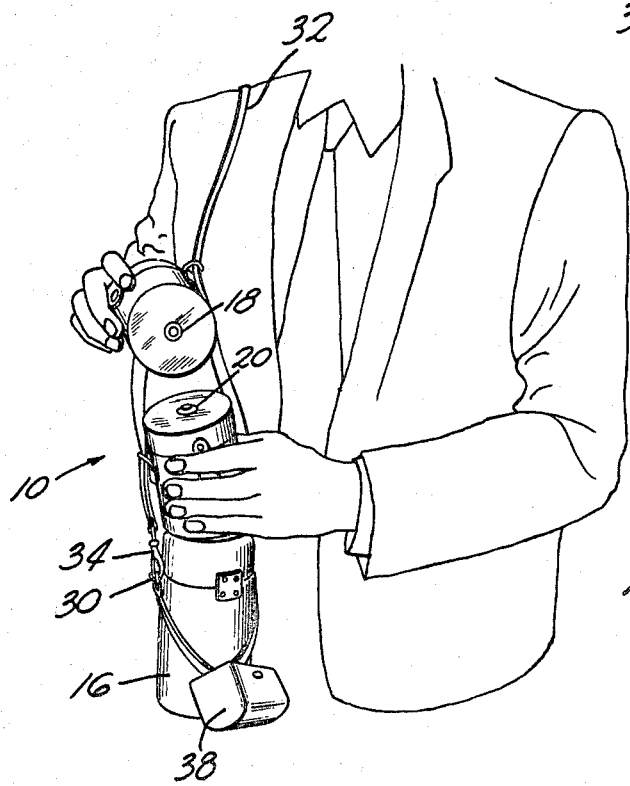
FIG. 2
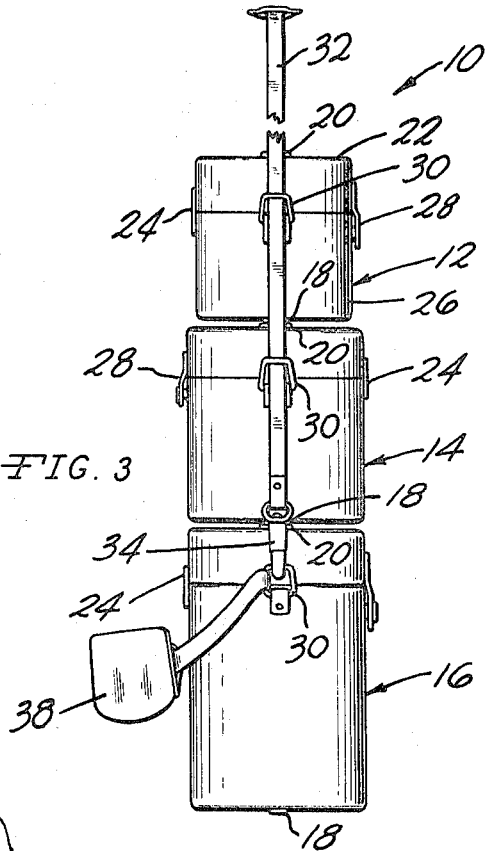
FIG. 3
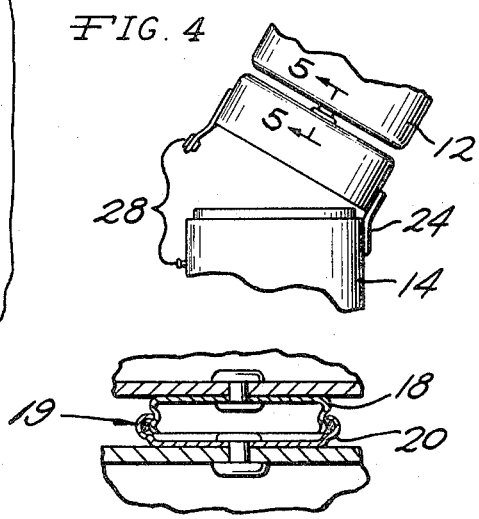
FIG. 4
FIG. 5
INVENTOR
CHARLES L. DOLPH
BY
*Olsen and Stephenson*
ATTORNEYS

PHOTOGRAPHY LUGGAGE

BACKGROUND OF THE INVENTION

This invention relates to improvements in luggage adapted for the storage and carrying of relatively small articles and more particularly to improvements in such luggage adapted to be used with photographic equipment and the like.

Because of the highly developed state of the art of photography, photographers find it necessary to use relatively large amounts of equipment in picture taking activities. Thus, the photographer frequently is loaded down with one or more cameras, a supply of film and a number of accessories such as a light exposure meter, interchangeable lenses, flash equipment, light filters, and the like.

Many carrying cases have been devised in the prior art for accommodating accessories of this character, and they are generally of the type described in the patent to Hinson, U.S. Pat. No. 2,827,096, issued Mar. 18, 1958. Because of the relatively large and bulky nature of gadget bags of this type, it is found that they are not ideally suited to meet todays travelling conditions, such as aboard airplanes and the like, and also they are not efficient to permit the photographer to use readily the equipment in the gadget bag when it is desired to take pictures on rather short notice.

SUMMARY OF THE INVENTION

The present invention has overcome the shortcomings of the prior art and has provided storage and carrying luggage for use by photographers for carrying accessory photographic equipment wherein the individual containers for the equipment are carried at the side of the photographer in an arrangement of a vertical column adapted to fit to the contours of his body and wherein the individual containers are readily accessible to the photographer to permit rapid use of such accessory photographic equipment.

According to one form of the present invention, storage and carrying luggage is provided comprising the combination of a plurality of containers for the photographic equipment, each container having loops on opposite sides through which a shoulder strap can be passed, snap fasteners are secured on the top and bottom of the containers which have a releasable cover which is hingedly connected to the body of the container, the containers being assembled in a column with the snap fasteners of each container being attached to the corresponding snap fasteners of the next adjacent container. A shoulder strap is passed through the loops on each of the containers and is secured in supporting engagement with the lowermost container so that the plurality of vertically assembled containers can be carried by the photographer and each container can readily be opened when desired, without removing the string of containers from the shoulder strap.

Accordingly, it is an object of the present invention to provide improved storage and carrying luggage, particularly but not exclusively adapted for use with photographic equipment.

Other objects of this invention will appear in the following description and appended claims, reference being had to the accompanying drawing forming a part of this specification wherein like reference characters designate corresponding parts in the several views.

BRIEF DESCRIPTION OF THE DRAWING

FIG. 1 is a perspective view of storage and carrying luggage embodying the present invention as it would normally be worn by a photographer, and showing one of the containers of the luggage in an open position to permit removal of its contents;

FIG. 2 is a perspective view similar to that of FIG. 1, but showing one of the containers disconnected from the next adjacent container;

FIG. 3 is a front elevational view of the storage and carrying luggage;

FIG. 4 is a fragmentary front elevational view showing the arrangement for hingedly connecting the cover to the body portion of the container; and FIG. 5 is a fragmentary section taken on the line 5-5 of FIG. 4, showing one type of snap fastener that may be employed for securing containers together.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The storage and carrying luggage 10 is shown to include three generally cylindrical containers 12, 14 and 16, each of which has the male element 18 of a snap fastener 19 on its bottom wall or surface, and a female element 20 on the upper wall or surface. In the illustrated embodiment, the upper wall or surface is formed in the cover 22 which is hingedly connected respectively at 24 to the lower portion or body 26 of the containers 12, 14 and 16. A suitable snap fastener 28 is provided on each of the containers for securing the cover to the body of such container.

Secured on opposite sides of each of the containers 12, 14 and 16 are metal loops 30 of a size to permit passage of a shoulder strap 32 therethrough. Preferably the ends of the shoulder strap 32 will have snap fasteners 34 thereon to permit the shoulder strap to be fastened to the lowermost container 16 so that when the containers 12, 14 and 16 are assembled in a generally vertical column, the lowermost container 16 will support the upper containers 12 and 14 thereon and the metal loops 30 will function to retain the column of containers in the assembled position.

The containers 12, 14 and 16 can be of a functional design adapted to hold photographic equipment, such as is shown in FIG. 1 wherein a lens 36 is shown supported in the container 14 which has its cover 22 in an open position. The conventional containers are modified to the extent of adding the snap fastener elements 18 and 20, and appropriate loop members 30 are provided on opposite sides. The snap fastener elements 18 and 20 can be riveted to the top and bottom walls of the containers, as is shown best in FIG. 5, and preferably a relatively small amount of universal movement can occur between the snap elements 18 and 20 so as to provide flexibility at the fitting to permit the column of containers to fit readily to the contour of the body of the carrier of the luggage.

If desired, the loops 30 can also be used to carry accessory film and the like as is shown by the arrangement whereby the case 38 is strapped to the lowermost container 16.

From the above description it will be understood that the storage and carrying luggage 10 can be conveniently carried by a photographer in crowded conditions such as may occur in areas where photographs are to be taken or during travel such as on airliners and the like, and the problems created by the large and bulky gadget bags known in the prior art are avoided. Also, the photographer can easily and quickly gain access to any of his photographic apparatus without the need of opening a gadget bag of the type known in the prior art, and selecting from all of the contents therein the particular apparatus which he desires to use. As shown in the drawing if the photographer desires to use a lens 36 for his camera, he can quickly gain access to the lens 36 merely by opening the cover of the container 14 and removing the lens 36. This can be done without disconnecting the container 14 from the column.

Also, the photographer can readily select the number of items that he wishes to carry with him. If he should select four containers, they can all be assembled in a vertical column in the same manner as the three shown in the drawing. The containers can readily be disconnected from one another merely by disconnecting the snap fastening elements 18 and 20 as is shown in FIG. 2. When this has been done, the shoulder strap 32 can be disconnected at one of its ends and the container which is not to be used can be removed from the shoulder strap, after which the shoulder strap can be reassembled through the loops 32 and connected to the loop 32 of the lowermost container 16. Thus, the photographer can quickly and easily control the apparatus that he will take with him and when carrying the apparatus it will be in an arrangement that is not as bulky and inconvenient to carry as the gadget bags previously used. Also, the apparatus in the luggage is more readily made available to him if he is in need of the same.

I claim:

1. Storage and carrying luggage comprising the combination of a plurality of containers each having loop retainer means on opposite sides, fastener means on the top and bottom surfaces and a releasable cover, said containers being assembled in a column with fastener means of each container being attached to fastener means of the next adjacent container, and a shoulder strap in supporting engagement with the lowermost container and passing through the loop retainer means of the remaining containers in the column.

2. Storage and carrying luggage as is defined in claim 1, wherein the releasable cover of each container is hingedly connected to the remainder of the container.

3. Storage and carrying luggage as is defined in claim 2, wherein said fastener means are snap fasteners.

4. Storage and carrying luggage as is defined in claim 3, wherein the snap fastener means on each container comprises male and female elements, one element being secured to the bottom wall of the container and the other element being secured to the top wall of the releasable cover.

5. Storage and carrying luggage as is defined in claim 4, wherein said containers are cylindrical in shape, and the male and female elements of each of the snap fastening means are aligned with the axis of their container.

6. Storage and carrying luggage as is defined by claim 1, wherein said shoulder strap includes a pair of snap hooks, said snap hooks being snapped onto the loop retainer means of said lowermost container.

7. A container for use with storage and carrying luggage comprising a lower section open at the top and having a bottom wall, an upper section having a top wall and defining a cover releasably fitted on said lower section to close the open top thereof, said bottom wall having secured thereto one of the male and female elements of a set of male and female snap fasteners, said top wall having secured thereto the other of the male and female elements of said set, and one of said sections having on opposite sides looplike means for receiving a shoulder strap.

8. A container as is defined in claim 7, wherein said looplike means are secured to said lower section.

9. A container as is defined in claim 7, wherein said upper section is hingedly connected to said lower section.